(12) United States Patent
Wang et al.

(10) Patent No.: US 11,236,247 B2
(45) Date of Patent: Feb. 1, 2022

(54) ULTRAVIOLET LIGHT STABLE COLOR-CHANGING SYSTEMS

(71) Applicant: Chromatic Technologies, Inc., Colorado Springs, CO (US)

(72) Inventors: Ruizheng Wang, Colorado Springs, CO (US); Timothy J. Owen, Colorado Springs, CO (US); Qi Wang, Mt Pleasant, SC (US)

(73) Assignee: Chromatic Technologies, Inc., Colorado Springs, CO (US)

( * ) Notice: Subject to any disclaimer, the term of this patent is extended or adjusted under 35 U.S.C. 154(b) by 211 days.

(21) Appl. No.: 16/262,684

(22) Filed: Jan. 30, 2019

(65) Prior Publication Data

US 2019/0241758 A1    Aug. 8, 2019

Related U.S. Application Data

(60) Provisional application No. 62/626,568, filed on Feb. 5, 2018.

(51) Int. Cl.
| | | |
|---|---|---|
| *C09D 11/50* | (2014.01) | |
| *C09D 11/037* | (2014.01) | |
| *C09D 11/322* | (2014.01) | |
| *C09D 11/38* | (2014.01) | |

(52) U.S. Cl.
CPC ............ *C09D 11/50* (2013.01); *C09D 11/037* (2013.01); *C09D 11/322* (2013.01); *C09D 11/38* (2013.01)

(58) Field of Classification Search
CPC ....... C09D 11/50; C09D 11/38; C09D 11/322; C09D 11/037

USPC ................ 106/262, 263, 266, 712, 741, 785
See application file for complete search history.

(56) References Cited

U.S. PATENT DOCUMENTS

| | | | |
|---|---|---|---|
| 2,434,496 A | * | 1/1948 | Houtman, Jr. .......... C08L 27/04 524/336 |
| 4,425,161 A | | 1/1984 | Shibahashi et al. |
| 5,558,700 A | | 9/1996 | Shibahashi et al. |
| 5,699,182 A | | 12/1997 | Alfekri |
| 5,873,932 A | | 2/1999 | Fujita et al. |
| 6,638,620 B2 | | 10/2003 | Nakashima et al. |
| 6,770,125 B2 | | 8/2004 | Chen et al. |
| 8,119,778 B2 | | 2/2012 | Fischer et al. |
| 9,039,946 B2 | | 5/2015 | Fischer et al. |
| 2015/0376433 A1 | | 12/2015 | Tozuka |

FOREIGN PATENT DOCUMENTS

| | | |
|---|---|---|
| EP | 0659582 | 6/1995 |
| EP | 0908501 | 4/1999 |
| WO | 2007/147847 | 12/2007 |

OTHER PUBLICATIONS

Forrester et al. Stable Nitroxide Radicls; Nature, Jul. 4, 1964, vol. 203, pp. 74-75.
Soule et al. The Chemistry and Biology of Nitroxide Compounds; Free Radic Biol Med. Jun. 1, 2007; 42(11): 1632-1650.

* cited by examiner

*Primary Examiner* — Justin V Lewis
(74) *Attorney, Agent, or Firm* — Craig R. Miles; CR Miles P.C.

(57) ABSTRACT

Disclosed herein are embodiments of (i) a novel stabilizer including a stable nitroxide free radical which can function as a light-stabilizer and/or a heat-stabilizer, and (ii) compositions including the stable nitroxide free radical.

15 Claims, No Drawings

ULTRAVIOLET LIGHT STABLE COLOR-CHANGING SYSTEMS

This United States Non-Provisional patent application claims the benefit of U.S. Provisional Patent Application No. 62/626,568, filed Feb. 5, 2018, hereby incorporated by reference in its entirety herein.

I. SUMMARY OF THE INVENTION

A broad object of a particular embodiment of the invention can be to provide (i) a novel stabilizer including a stable nitroxide free radical which can function as a light-stabilizer and/or a heat-stabilizer, and (ii) compositions including the stable nitroxide free radical.

Naturally, further objects of the invention are disclosed throughout other areas of the specification, and claims.

II. DETAILED DESCRIPTION OF THE PREFERRED EMBODIMENTS

The present invention relates to a novel stabilizer including a stable nitroxide free radical which can function as a light-stabilizer and/or a heat-stabilizer.

The term "stable" as used herein in relation to the nitroxide free radical means that the nitroxide free radical is not transient, and may tend to remain in the same chemical state and/or resist altering itself to another form. Correspondingly, as to particular embodiments, the stable nitroxide free radical can be isolated and/or purified and/or stored.

The term "light" as used herein means electromagnetic radiation, and can broadly include at least infrared light, visible light, and ultraviolet light.

The term "light-stable" as used herein means photostable, or resistant to degradation under the influence of electromagnetic radiation, such as light.

The term "heat-stable" as used herein means thermostable, or resistant to degradation under the influence of heat energy or heat.

As to particular embodiments, the present invention relates to a novel combination of components which together provide a light-stable and/or heat-stable composition, whereby the light-stable and/or heat-stable composition includes (i) a light-degradable and/or heat-degradable compound, and (ii) a stabilizer which enhances the light-stability and/or heat-stability of the light-degradable and/or heat-degradable compound.

Additionally, the present invention relates to a novel combination of components which together provide a light-stable composition, whereby the light-stable composition includes (i) a light-degradable compound, and (ii) a stabilizer which enhances the light-stability of the light-degradable compound.

Moreover, the present invention relates to a novel combination of components which together provide a heat-stable composition, whereby the heat-stable composition includes (i) a heat-degradable compound, and (ii) a stabilizer which enhances the heat-stability of the heat-degradable compound.

Further, the present invention relates to a novel combination of components which together provide a light-stable and heat-stable composition, whereby the light-stable and heat-stable composition includes (i) a light-degradable and heat-degradable compound, and (ii) a stabilizer which enhances the light-stability and heat-stability of the light-degradable and heat-degradable compound.

Specifically, the stabilizer is a stable nitroxide free radical and importantly, the stable nitroxide free radical is directly incorporated into the composition as a stable nitroxide free radical, which is in stark contrast to incorporating a precursor of a free radical into the composition, whereby the precursor must react to generate the free radical. Said another way, the stabilizer is directly provided as a stable nitroxide free radical to the composition.

Advantageously, by directly incorporating the stable nitroxide free radical into the composition, a significantly lesser amount of stabilizer is required relative to an amount of precursor needed to achieve a similar or equivalent level of stability of the degradable compound.

Without being bound by any particular theory of operation, it is believed that within the composition, the stable nitroxide free radicals interact with free radicals generated by exposure to light (such as ultraviolet light) and/or heat, thus scavenging these free radicals and precluding them from interacting with the degradable compound. In this way, the stable nitroxide free radicals act to stabilize the degradable compound when exposed to light and/or heat, thereby enhancing the light-stability and/or heat-stability of the degradable compound.

Regarding concentration, the amount of stable nitroxide free radical can be in a range of between about 0.001% to about 50% by weight of the composition.

Again regarding concentration, as to particular embodiments, the amount of stable nitroxide free radical is not greater than about 1% by weight of the composition.

Again regarding concentration, as to particular embodiments, the amount of stable nitroxide free radical is not greater than about 0.1% by weight of the composition.

Again regarding concentration, as to particular embodiments, the amount of stable nitroxide free radical is not greater than about 0.01% by weight of the composition.

Again regarding concentration, as to particular embodiments, the amount of stable nitroxide free radical is not greater than about 0.001% by weight of the composition.

Again regarding concentration, as to particular embodiments, the amount of stable nitroxide free radical is in a range of between about 0.001% to about 1% by weight of the composition.

Now referring primarily to Formula I, the stable nitroxide free radical of the instant invention has the following formula:

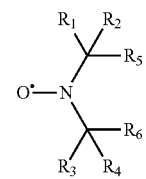

I wherein:

$R_1$ is independently alkyl, or forms a ring together with $R_2$ or $R_3$;

$R_2$ is independently alkyl, or forms a ring together with $R_1$ or $R_4$;

$R_3$ is independently alkyl, or forms a ring together with $R_1$ or $R_4$;

$R_4$ is independently alkyl, or forms a ring together with $R_2$ or $R_3$; and $R_5$ and $R_6$ are each independently alkyl, or together form a ring.

As used herein, the term "alkyl" or "alkyl moiety" can be saturated or unsaturated, depending upon the embodiment. Further, the alkyl group can be unsubstituted or substituted, depending upon the embodiment. Still further, the alkyl moiety can be straight chain (linear) or branched, depending upon the embodiment. Yet still further, the alkyl moiety can be acyclic or cyclic, depending upon the embodiment.

As to particular embodiments, at least one of: $R_1$ and $R_2$ together form a ring; $R_3$ and $R_4$ together form a ring; $R_1$ and $R_3$ together form a ring; $R_2$ and $R_4$ together form a ring; or $R_5$ and $R_6$ together form a ring.

Regarding the latter and now referring primarily to Formulas II through VIII, as to particular embodiments, $R_5$ and $R_6$ can together form: a 5-membered ring (as shown in the examples of Formulas II, III, IV, VI, VII, and VIII), a 6-membered ring (as shown in the example of Formula V), or a 7-membered ring (not shown).

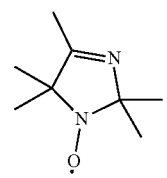

II

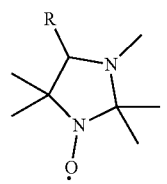

III

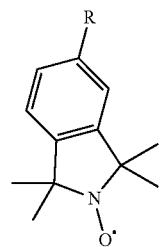

IV

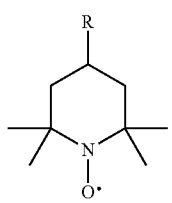

V

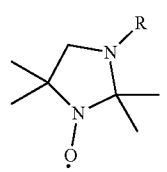

VI

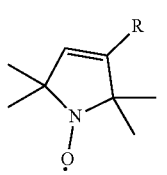

VII

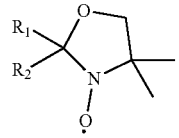

VIII

Again referring primarily to Formulas II through VIII, typically, $R_5$ and $R_6$ together form a heterocyclic ring structure, having atoms of at least two different elements as members of the ring, whereby at least the nitrogen of the nitroxide moiety is included in the ring to provide a nitrogen-containing ring. Accordingly, the stable nitroxide free radical is a cyclic stable nitroxide free radical. As to particular embodiments, additional atoms, such as another nitrogen, an oxygen, or a sulfur can be included in the ring.

As to particular embodiments, the cyclic stable nitroxide free radical can include at least one hindering group at an alpha position relative to the nitrogen in the ring, whereby the hindering group(s) can contribute to the stability of the stable nitroxide free radical, for example by sterically inhibiting dimerization. As but one illustrative example, there can be di-methyl moieties attached to both alpha carbons flanking the nitrogen in the ring (as shown in Formulas II through VII).

Of note, in addition to the hindering group(s), electron delocalization or resonance may also contribute to the stability of the stable nitroxide free radical.

Again referring primarily to Formulas II through VIII, as to particular embodiments, the cyclic stable nitroxide free radical can belong to a class selected from the group consisting of: imidazoline (as shown by the example of Formula II), imidazolidine (as shown by the example of Formula III), isoindoline (as shown by the example of Formula IV), piperidine (as shown by the example of Formula V), pyrrolidine (as shown by the example of Formula VI), pyrroline (as shown by the example of Formula VII), and dioxyl nitroxide (as shown by the example of Formula VIII).

As to particular embodiments, the cyclic stable nitroxide free radical can be a mono-nitroxide free radical, of which illustrative examples are shown in Table 7.

TABLE 7

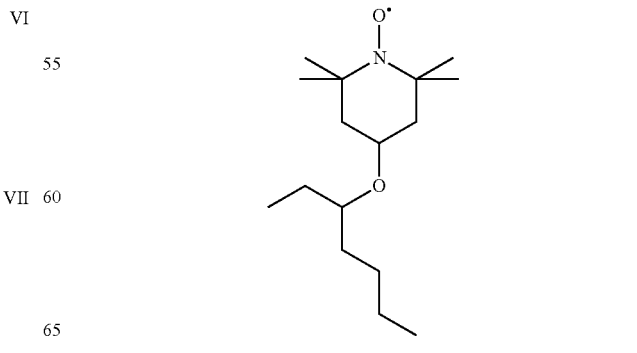

TABLE 7-continued
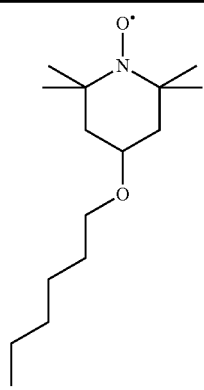
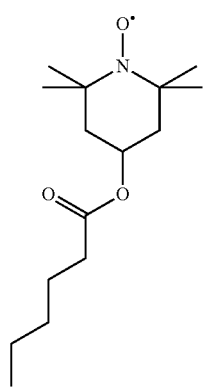
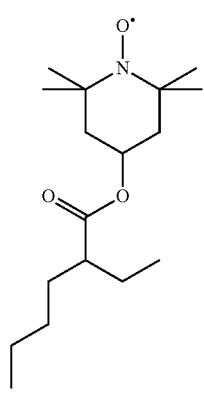
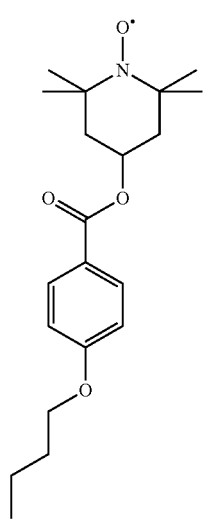
TABLE 7-continued
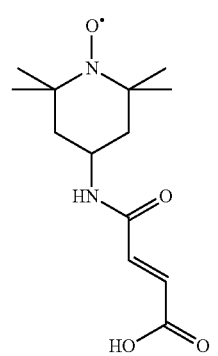
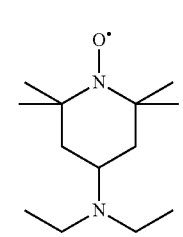
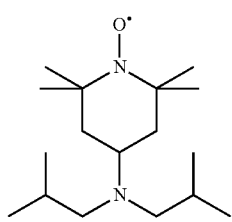
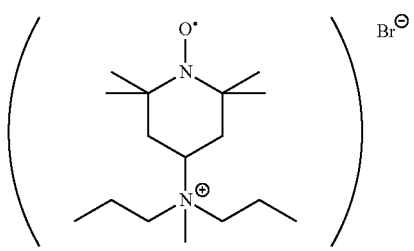
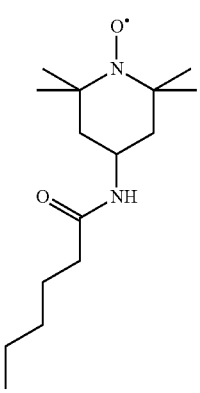

TABLE 7-continued
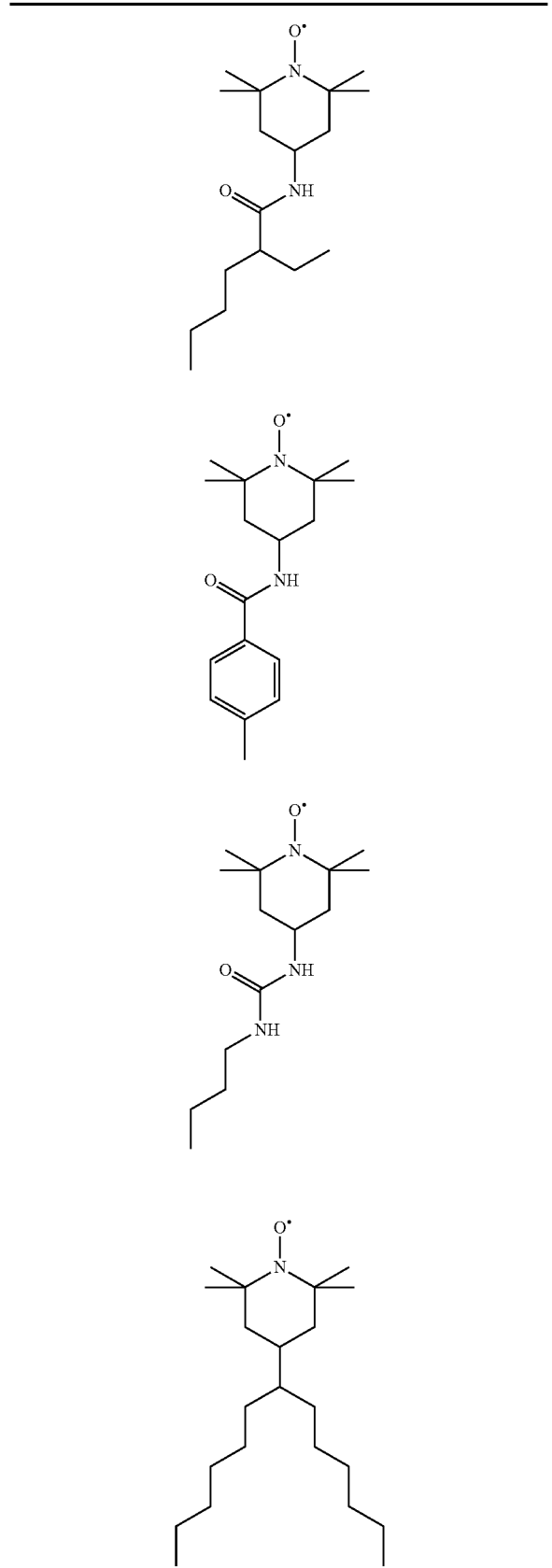
TABLE 7-continued
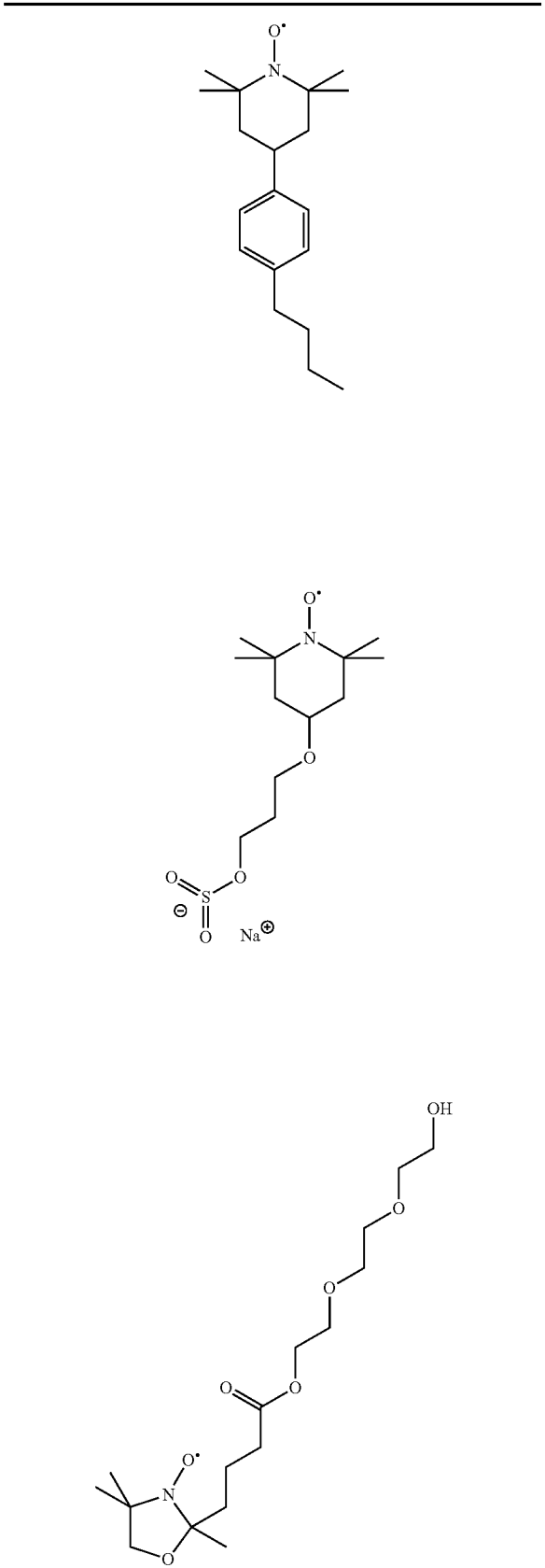

TABLE 7-continued
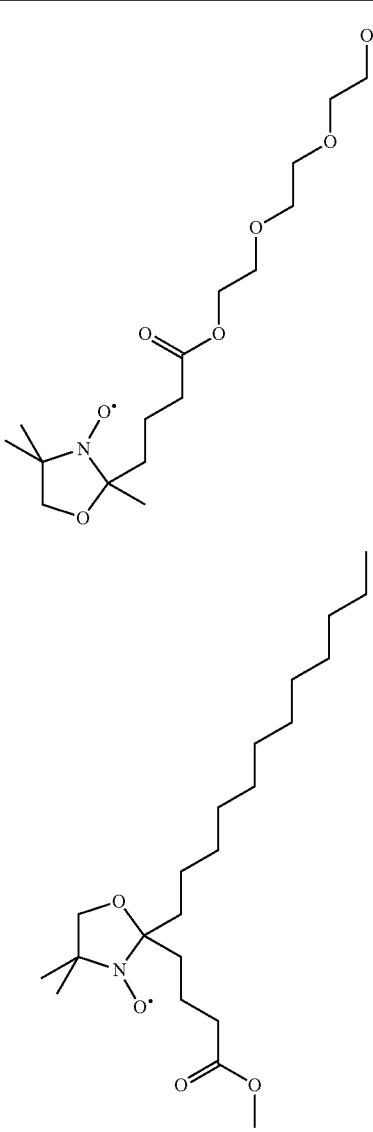
TABLE 7-continued
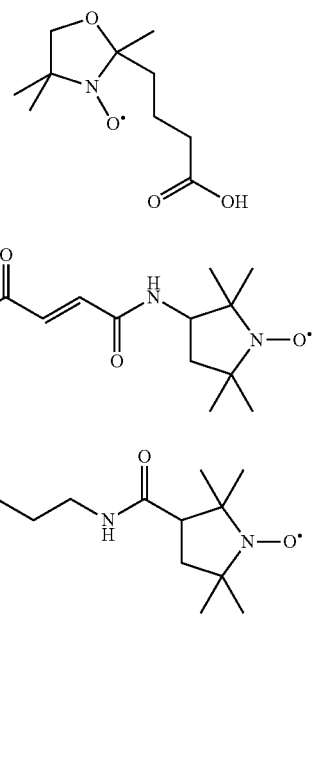
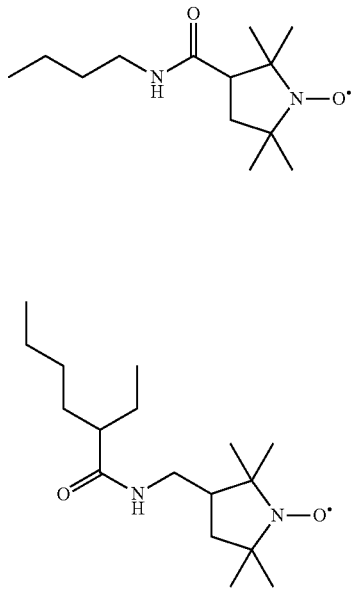
As to particular embodiments, the cyclic stable nitroxide free radical can be a di-nitroxide free radical, of which illustrative examples are shown in Table 8.
TABLE 8
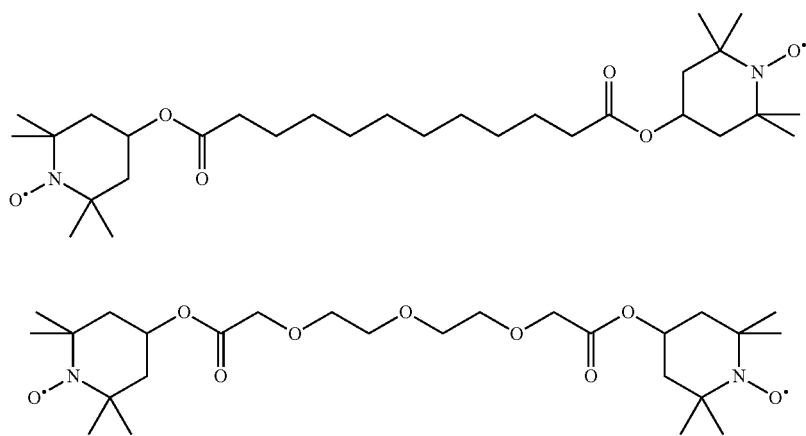

TABLE 8-continued
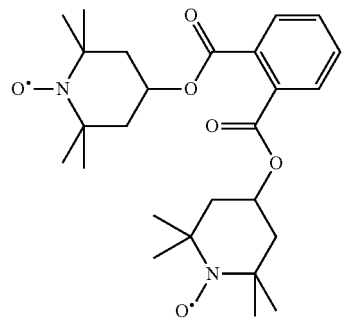
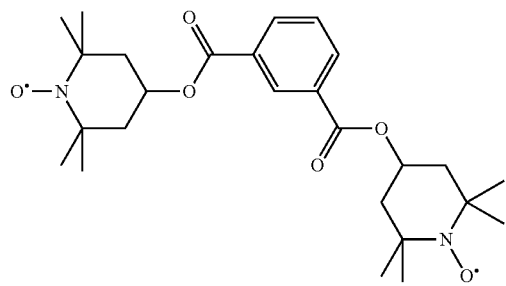
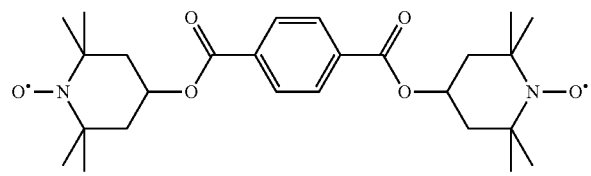
As to particular embodiments, the cyclic stable nitroxide free radical can be a tri-nitroxide free radical, of which illustrative examples are shown in Table 9.
TABLE 9
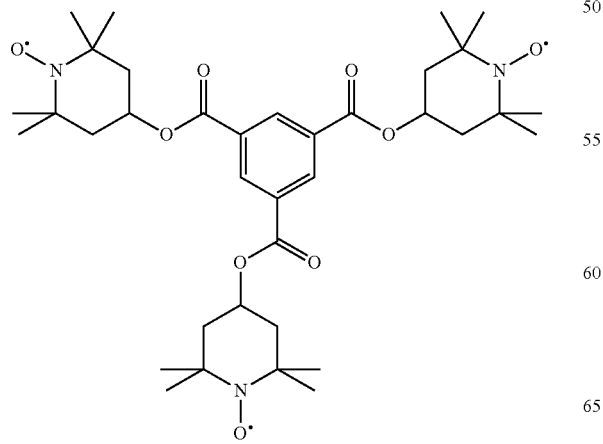
TABLE 9-continued
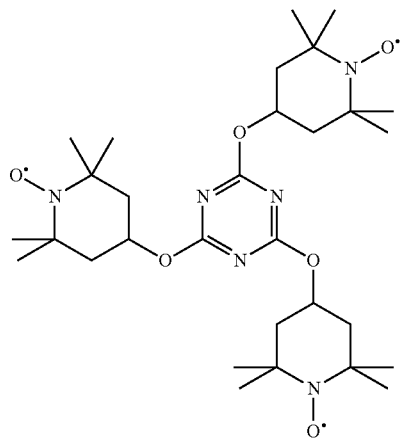
As to particular embodiments, the cyclic stable nitroxide free radical can be a tetra-nitroxide free radical, of which illustrative examples are shown in Table 10.

TABLE 10
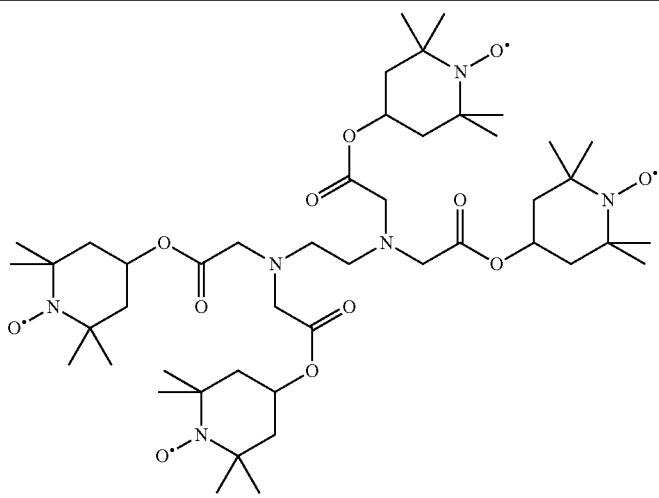
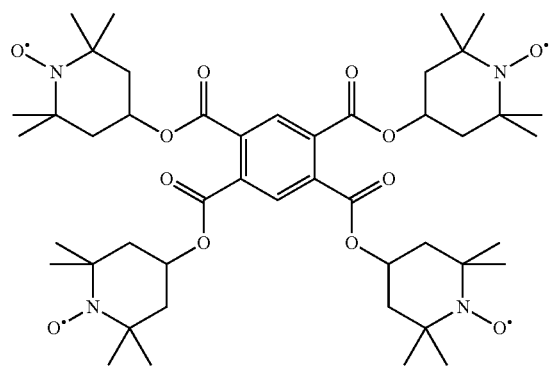
As to particular embodiments, the cyclic stable nitroxide free radical can be incorporated into a polymer, of which illustrative examples are shown in Table 11.
TABLE 11
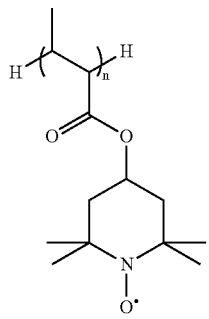
TABLE 11-continued
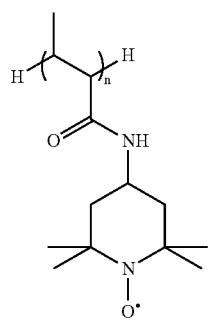
As to particular embodiments, the cyclic stable nitroxide free radical can be bonded to another molecule, of which illustrative examples are shown in Table 12.

TABLE 12
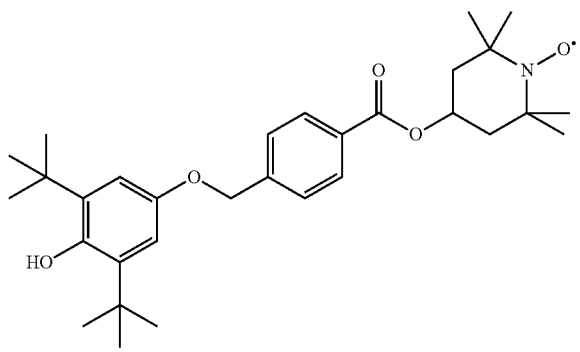
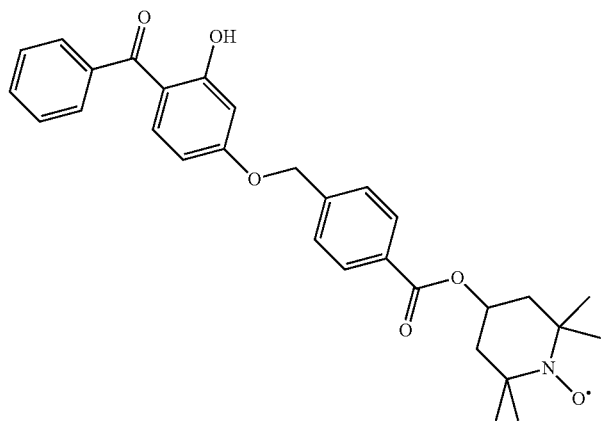
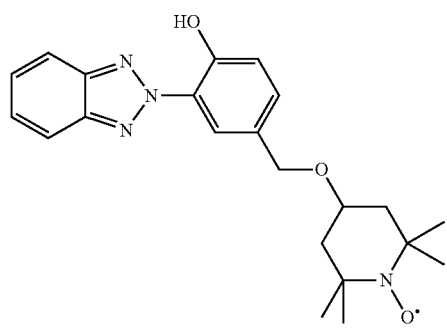
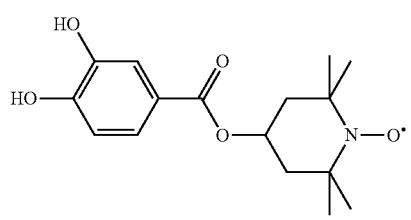

TABLE 12-continued

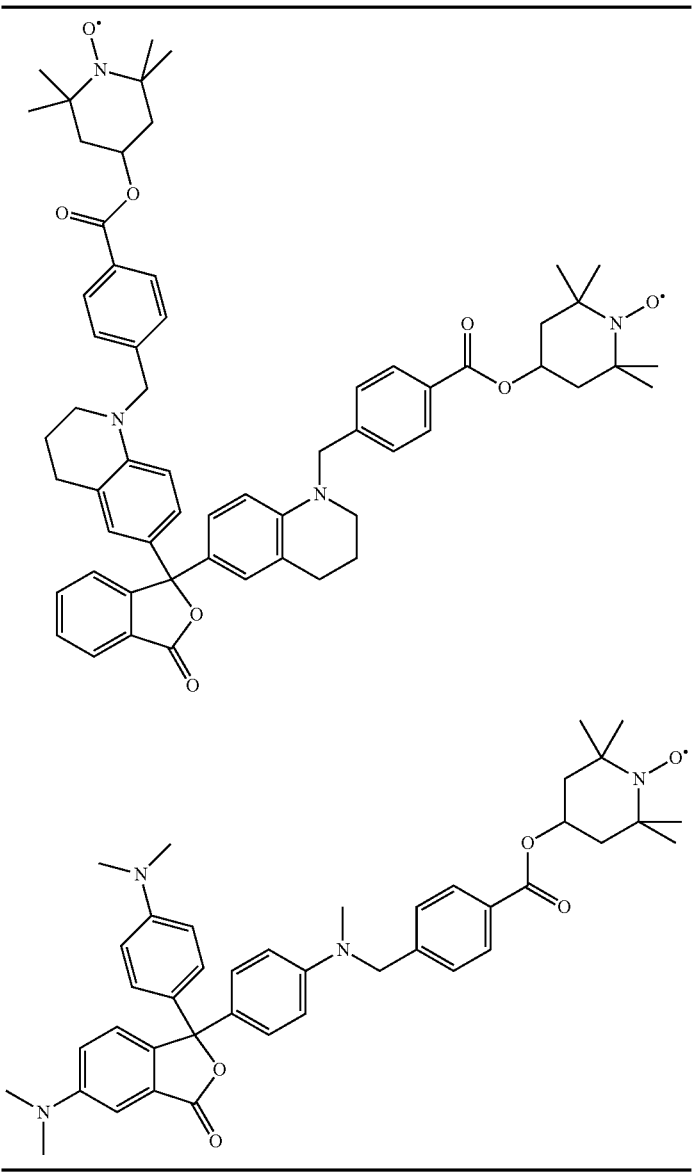

Color-Changing System

As to particular embodiments, the present invention relates to a novel combination of components which together provide a light-stable and/or heat-stable composition including a color-changing system comprising a color-changing compound which can be light-degradable and/or heat-degradable, a solvent, and a stabilizer which enhances the light-stability and/or heat-stability of the color-changing compound, whereby the stabilizer can be the stable nitroxide free radical, as described above.

Encapsulation

Now regarding encapsulation, as to particular embodiments, the color-changing system can be encapsulated within a microcapsule to provide a microencapsulated color-changing system. To form the microcapsules, the color-changing compound, the solvent, and the stabilizer can be combined in an aqueous medium to provide an internal phase about which a polymeric capsule wall can be built, whereby these methods are known to one of ordinary skill in the art of microencapsulation.

To reiterate, the stabilizer is directly incorporated into the color-changing system as a stable nitroxide free radical and thus, the internal phase about which the polymeric capsule wall is built contains the stable nitroxide free radical as a stabilizer component.

As to particular embodiments, the microcapsules can have a diameter of less than about 10 microns.

As to particular embodiments, the microcapsules can have a diameter of less than about 5 microns.

As to particular embodiments, the microcapsules can have a diameter in a range of between about 300 nanometers to about 5 microns.

Importantly, it is herein instantly recognized that the diameter of the particles formed upon combination of a color-changing compound, a solvent, and the instant stable nitroxide free radical in the aqueous medium to provide the internal phase can be lesser than the diameter of particles formed upon combination of the same color-changing compound and the same solvent without the instant stable nitroxide free radical.

Correspondingly, the diameter of the microcapsules, each of which comprises the polymeric capsule wall built about the internal phase, can also be lesser for microcapsules encapsulating a color-changing compound, a solvent, and the instant stable nitroxide free radical relative to microcapsules encapsulating the same color-changing compound and the same solvent without the instant stable nitroxide free radical.

As but a first illustrative example, an experiment was performed whereby the particle diameter of microcapsules encapsulating a red color-changing compound (specifically 3,3-bis(1-butyl-2-methyl-1H-indol-3-yl)phthalide; CAS No.: 50292-91-6), a solvent, and the instant stable nitroxide free radical was compared with the particle diameter of microcapsules encapsulating the same red color-changing compound and the same solvent but without the instant stable nitroxide free radical; the particle diameter of the former was about 0.76 microns whereas the particle diameter of the latter was about 0.86 microns, the former being lesser than the latter by about 12%.

As but a second illustrative example, an experiment was performed whereby the particle diameter of microcapsules encapsulating a green color-changing compound (specifically 2'-(dibenzylamino)-6'-(diethylamino)fluoran; CAS No.: 34372-72-0), a solvent, and the instant stable nitroxide free radical was compared with the particle diameter of microcapsules encapsulating the same green color-changing compound and the same solvent but without the instant stable nitroxide free radical; the particle diameter of the former was about 0.98 microns whereas the particle diameter of the latter was about 2 microns, the former being lesser than the latter by about 51%.

As but a third illustrative example, an experiment was performed whereby the particle diameter of microcapsules encapsulating a blue color-changing compound (specifically 7-[4-(diethylamino)-2-ethoxyphenyl]-7-(1-ethyl-2-methyl-1H-indol-3-yl)furo[3,4-b]pyridin-5(7H)-one; CAS No.: 69898-40-4), a solvent, and the instant stable nitroxide free radical was compared with the particle diameter of microcapsules encapsulating the same blue color-changing compound and the same solvent but without the instant stable nitroxide free radical; the particle diameter of the former was about 1.1 microns whereas the particle diameter of the latter was about 0.71 microns, the former being lesser than the latter by about 36%.

As but a fourth illustrative example, an experiment was performed whereby the particle diameter of microcapsules encapsulating an aqua color-changing compound (specifically 3,3-bis(2-ethoxy-4-N,N-diethylaMinophenyl)-7(4)-azaphthalide; CAS No.: 132467-74-4), a solvent, and the instant stable nitroxide free radical was compared with the particle diameter of microcapsules encapsulating the same aqua color-changing compound and the same solvent but without the instant stable nitroxide free radical; the particle diameter of the former was about 1.5 microns whereas the particle diameter of the latter was about 1.19 microns, the former being lesser than the latter by about 21%.

Color-Changing Compound

Now regarding color change, the color-changing compound of the color-changing system can either irreversibly or reversibly change color, depending upon the application.

As to particular embodiments, the color-changing compound can comprise a leuco dye which can change between two forms, one of which is typically colorless or substantially colorless.

As to particular embodiments, leuco dyes which may be useful as a color-changing compound can belong to the following classes, which are meant to be non-limiting examples: diphenylmethane phthalides, phenylindolyl phthalides, indolyl phtahlides, diphenylmethane azaphthalides, phenylindolyl phthalides, fluoraones, styrlquinolines, pyridines, quinazolines, bisquinazolines, and ethylenophthalides.

As to particular embodiments, leuco dyes which may be useful as a color-changing compound can include the following, which are meant to be non-limiting examples: 3,3-bis(p-dimethylaminophenyl)-6-dimethylaminophthalide; 3-(4-diethylaminophenyl)-3-(1-ethyl-2-methylindole-3-yl)phthalide; 3,3-bis(1-n-butyl-2-methylindole-3-yl)phthalide; 3,3-bis(2-ethoxy-4-diethylaminophenyl)-4-azaphthalide, 3-(2-ethoxy-4-(N,N-diethylamino)phenyl)-3-(1-ethyl-2-methylindole-3-yl)-4-azaphthalide; 3,6-diphenyl aminofluoran; 3,6-dimethoxy fluoran; 3,6-di-n-butoxy fluoran; 2-methyl-6-(N-ethyl-N-p-tolylamino)fluoran; 3-chloro-6-cyclohexylaminofluoran; 2-methyl-6-cyclohexylaminofluoran; 2-((2-chloroanilino)-6-di-n-butylaminofluoran; 2-((3-trifluoromethylanilino)-6-diethylaminofluoran; 2-((N-methylanilino)-6-(N-ethyl-N-p-tolylamino)fluoran; 1,3-dimethyl-6-diethylaminofluoran; 2-chloro-3-methyl-6-diethylaminofluoran; 2-anilino-3-methyl-6-diethylaminofluoran; 2-anilino-3-methyl-6-di-n-butylaminofluoran; 2-xylidino-3-methyl-6-diethyl aminofluoran; 1,2-benzo-6-diethylaminofluoran; 1,2-benzo-6-(N-ethyl-N-isobutylamino)fluoran; 1,2-benzo-6-(N-ethyl-N-isoamylamino)fluoran; 2-((3-methoxy-4-dodecoxystyryl)quinolone; spiro(5H-(1)benzopyrano(2,3-d)pyrimidine-5,1'(3'H) isobenzofuran)-3'-one; 2-((diethylamino)-8-(diethylamino)-4-methyl-spiro(5H-(1) benzopyrano(2,3-g)pyrimidine-5,1'(3'H)isobenzofuran)-3-one; 2-((di-n-butylamino)-8-(di-n-butylamino)-4-methyl-spiro-(5H-(1)benzopyrano(2,3-g)pyrimidine-5,1'(3H)isobenzofuran)-3-one; 2-((di-n-butylamino)-8-(diethylamino)-4-methyl-spiro-(5H-(1)benzopyrano(2,3-g)pyrimidine-5,1'(3'H)isobenzofuran)-3-one; 2-((di-n-butylamino)-8-(N-ethyl-N-i-amylamino)-4-methyl-spiro(5H-(1)benzopyrano(2,3-g)pyrimidine-5,1'(3'H)isobenzofuran)-3-one; 2-((dibutylamino)-8-(dipentylamino)-4-methyl-spiro-(5H-(1)benzopyrano(2,3-g)pyrimidine-5,1'(3$^1$H)isobenzofuran)-3-one; 3-((2-methoxy-4-dimethylaminopheriyl)-3-(1-butyl-2-methylindole-3-yl)-4,5,6,7-tetrachlorophthalide; 3-((2-ethoxy-4-diethylaminophenyl)-3-(1-ethyl-2-methylindole-3-yl)-4,5,6,7-tetrachlorophthalide; 3-((2-ethoxy-4-diethylaminophenyl)-3-(1-pentyl-2-methylindole-3-yl)-4,5,6,7-tetrachlorophthalide; 4,5,6,7-tetrachloro-3-(4-(dimethylamino)-2-methylphenyl)-3-(1-ethyl-2-methyl-1H-indole-3-yl)-1(3H)-isobenzofuranone; 3',6'-bis(phenyl(2-methylphenyl)amino)-spiro(isobenzofuran-1(3H),9'-(9H)xanthene)-3-one; 3',6'-bis(phenyl(3-methylphenyl)amino)-spiro (isobenzofuran-1(3H), 9'-(9H)xanthene)-3-one; 3',6-bis (phenyl(3-ethylphenyl)amino)-spiro(isobenzofuran-1(3H), 9'-(9H)xanthene)-3-one; 3,3-bis(p-dimethylaminophenyl)-6-dimethylaminophthalide; 3-(4-diethylaminophenyl)-3-(1-ethyl-2-methylindole-3-yl)phthalide; 3,3-bis(1-n-butyl-2-methylindole-3-yl)phthalide; 3,3-bis(2-ethoxy-4-diethylaminophenyl)-4-azaphthalide; 3-(2-ethoxy-4-(N-ethylanilino)phenyl)-3-(1-ethyl-2-methylindole-3-yl)-4-azaphthalide; 3,6-diphenyl aminofluoran; 3,6-dimethoxy fluoran; 3,6-di-n-butoxy fluoran; 2-methyl-6-(N-ethyl-N-p-tolylamino)fluoran; 3-chloro-6-cyclohexylaminofluoran; 2-methyl-6-cyclohexylaminofluoran; 2-((2-chloroanilino)-6-di-n-butylaminofluoran; 2-((3-trifluoromethylanilino)-6-diethylaminofluoran; 2-((N-methylanilino)-6-(N-ethyl-N-p-tolylamino)fluoran; 1,3-dimethyl-6-diethylaminofluoran; 2-chloro-3-methyl-6-diethylaminofluoran; 2-anilino-3-methyl-6-diethylaminofluoran; 2-anilino-3-methyl-6-di-n- butylaminofluoran; 2-xylidino-3-methyl-6-diethyl aminofluoran; 1,2-benzo-6-diethylaminofluoran; 1,2-benzo-6-(N-ethyl-N-isobutylamino)fluoran; 1,2-benzo-6-(N-ethyl-N-isoamylamino)fluoran; 2-((3-methoxy-4-dodecoxystyryl) quinolone; spiro(5H-(1)benzopyrano(2,3-d)pyrimidine-5,1' (3'H) isobenzofuran)-3'-one; 2-((diethylamino)-8-(diethylamino)-4-methyl-spiro(5H-(1) benzopyrano(2,3-g)pyrimidine-5,1'(3'H)isobenzofuran)-3-one; 2-((di-n-butylamino)-8-(di-n-butylamino)-4-methyl-spiro-(5H-(1)benzopyrano(2,3-g)pyrimidine-5,1'(3H)isobenzofuran)-3-one; 2-((di-n-butylamino)-8-(diethylamino)-4-methyl-spiro-(5H-(1)benzopyrano(2,3-g)pyrimidine-5,1'(3'H)isobenzofuran)-3-one; 2-((di-n-butylamino)-8-(N-ethyl-N-i-amylamino)-4-methyl-spiro(5H-(1)benzopyrano(2,3-g)pyrimidine-5,1' (3'H)isobenzofuran)-3-one; 2-((dibutylamino)-8-(dipentylamino)-4-methyl-spiro-(5H-(1)benzopyrano(2,3-g)pyrimidine-5,1'(3'H)isobenzofuran)-3-one; 3-((2-methoxy-4-dimethylaminopheriyl)-3-(1-butyl-2-methylindole-3-yl)-4, 5,6,7-tetrachlorophthalide; 3-((2-ethoxy-4-diethylaminophenyl)-3-(1-ethyl-2-methylindole-3-yl)-4,5,6,7-tetrachlorophthalide; 3-((2-ethoxy-4-diethylaminophenyl)-3-(1-pentyl-2-methylindole-3-yl)-4,5,6,7-tetrachlorophthalide; 4,5,6, 7-tetrachloro-3-(4-(dimethylamino)-2-methylphenyl)-3-(1-ethyl-2-methyl-1H-indole-3-yl)-1(3H)-isobenzofuranone; 3',6'-bis(phenyl(2-methylphenyl)amino)-spiro(isobenzofuran-1(3H),9'-(9H)xanthene)-3-one; 3',6'-bis(phenyl(3-methylphenyl)amino)-spiro(isobenzofuran-1(3H),9'-(9H) xanthene)-3-one; 3',6-bis(phenyl(3-ethylphenyl)amino)-spiro(isobenzofuran-1(3H),9'-(9H)xanthene)-3-one; 7-(diethylamino)-3-(dimethylamino)-1-phenyl-spiro((1) benzopyrano(2,3-c)pyrazole-4(1H), 1'(3'H)-isobenzofuran)-3'-one; 7-(diethyl amino)-3-methyl-1-methyl-spiro((1)benzopyrano(2,3-c)pyrazole-4(1H), 1'(3'H)-isobenzofuran)-3'-one; and 7-(diethylamino)-3-methyl-1-acetyl-spiro((1) benzopyrano(2,3-c)pyrazole-4(1H), 1'(3'H)-isobenzofuran)-3'-one.

As to particular embodiments, the color-changing compound can comprise a photochromic compound having photochromic properties, whereby the photochromic compound can exhibit a color when in a colored state achieved upon exposure to light, such as ultraviolet light. Upon discontinuation of exposure to the ultraviolet light, the photochromic compound can transition from the colored state to a colorless or substantially colorless state, in which the photochromic compound appears colorless or substantially colorless.

As to particular embodiments, the color-changing compound can comprise a thermochromic compound having thermochromic properties, whereby the thermochromic compound can be susceptible to a temperature-modulated color change, for example between a colored state and a colorless or substantially colorless state.

As to particular embodiments, the thermochromic compound can be an electron-donating compound (or proton-accepting compound).

As to particular embodiments having a thermochromic compound which is an electron-donating compound, the color-changing system can further include a color developer which acts as an electron-accepting compound (or proton-donating compound) to facilitate the temperature-modulated color change, for example between a colored state and a colorless or substantially colorless state.

As to particular embodiments, the developer can be an acid.

As to particular embodiments, developers which may be useful for the instant color-changing system can belong to the following classes, which are meant to be non-limiting examples: phenols, bisphenols, benzoic acids, catechols, gallates, resorcinols, salicylic acids, and benzotriazoles.

As to particular embodiments, developers which may be useful for the instant color-changing system can include the following, which are meant to be non-limiting examples: phenol; o-cresol; tertiary butyl catechol; nonylphenol; n-octylphenol; n-dodecylphenol; n-stearyl phenol; p-chlorophenol; p-bromophenol; o-phenylphenol; n-butyl p-hydroxybenzoate; n-octyl p-hydroxybenzoate; resorcin; n-dodecyl gallate; 2,2-bis(4-hydroxyphenyl)propane; 4,4-dihydroxydiphenyl sulfone; 1,1-bis(4-hydroxyphenyl)ethane; 2,2-bis(4-hydroxy-3-methylphenyl)propane; bis(4-hydroxyphenyl) sulfide; 4,4'-Thiobis(6-tert-butyl-m-cresol); 1-phenyl-1,1-bis(4-hydroxy-phenyl)ethane; 1,1-bis(4-hydroxyphenyl)-3-methylbutane; 1,1-bis(4-hydroxyphenyl)-2-methyl propane; 1,1-bis(4-hydroxyphenyl) n-hexane; 1,1-bis(4-hydroxyphenyl) n-heptane; 1,1-bis(4-hydroxyphenyl) n-octane; 1,1-bis (4-hydroxyphenyl) n-nonane; 1,1-bis(4-hydroxyphenyl) n-decane; 1,1-bis(4-hydroxyphenyl) n-dodecane; 2,2-bis(4-hydroxyphenyl) butane; 2,2-bis(4-hydroxyphenyl)ethyl propionate; 2,2-bis(4-hydroxyphenyl)-4-methylpentane; 2,2-bis(4-hydroxyphenyl)hexafluoropropane; 2,2-bis-(4-hydroxyphenyl) n-heptane; 2,2-bis(4-hydroxyphenyl) n-nonane; 1,1-bis(4-hydroxyphenyl)-2-ethylhexane; bis(4-hydroxyphenyl) methane; bis-(4-hydroxyphenyl) diphenylmethane; 1,1-bis(4-hydroxyphenyl)-3,3,5-trimethylcyclohexane; Tetrabromobisphenol A; 1,1'-methylenedi-2-naphthol; 1,1,1-tris(4-hyroxypheny)ethane; 1,1-bis(3-cyclohexyl-4-ydroxypheny)cyclohexane; 1,1-bis(4-hydroxy-3-methylphenyl)cyclohexane; 1,1-bis(4-hydroxyphenyl)cyclohexane; 1,4-bis(2-(4-hydroxyphenyl)-2-propyl)benzene; 5-methyl-1-H-benzo[d][1,2,3,]triazole; propyl 1H-benzo[d] [1,2,3]triazole-5-carboxylate; 1H-benzo[d][1,2,3]triazole; propane-1,3-diyl bis(1H-benzo[d][1,2,3]triazole-5-carboxylate; 5,5'-(2-ethylhexane-1,1-diyl)bis(1H-benzo[d][1,2,3]triazole; 1-naphthol; 2-naphthol; 2,2-bis(2-hydroxy-5-biphenylyl)propane; 2,2-bis(3-cyclohexy-4-hydroxy)propane; 2,2-bis(3-sec-butyl-4-hydroxyphenyl)propane; 2,2-bis(4-hydroxy-3-isopropylphenyl)propane; 2,2-bis(4-hydroxy-3-methylphenyl)propane; 2,2-bis(4-hydroxyphenyl)propane; 2,3,4-trihydroxydiphenylmethane; 4,4'-(2-ethylidene) diphenol; 4,4'-(2-hydroxybenzylidene)bis(2,3,6-trimethylphenol); 4,4'-biphenol; 4,4'-dihydroxyldiphenyl ether; 4,4'-methylidenebis(2-methylphenol); 5,5'-(methylethylidene)-bis(1,1'-(bisphenyl)-2-ol) propane; 4-(1,1,3,3,-tetramethylbutyl)phenol; 4-phenylphenol; 4-tert-butylphenol; 9,9-bis(4-dihydroxyphenyl)fluorine; 4,4'-(ethane-1,1-diyl) diphenol; alpha, alpha'-bis(4-hydroxyphenyl)-1,4-diisopropylbenzene; alpha, alpha, alpha'-tris(4-hydroxyphenyl)-1-ethyl-4-isopropylbenzene; benzyl-4-hydroxybenzoate; propyl-4-hydroxybenzoate; methyl-4-hydroxybenzoate; resorcinol; 4-tert-butyl-catechol; 4-tert-butyl-benzoic acid; 3,5-di-tertbutyl-salicylic acid; zinc 3,5-ditertbutylsalicylate; 3-phenyl-salicylic acid; 5-tertbutyl-salicylic acid; 5-n-octyl-salicylic acid; 2,2'-biphenol; 2,2-bis(3-chloro-4-hydroxyphenyl)-4-methylpentane; dodecyl-3,4-dihydroxybenzoate; dodecyl-4-hydroxybenzoate; propyl-3-chloro-4-hydroxybenzoate; dodecyl-3-chloro-4-hydroxybenzoate; and 3,4,5-trihydroxybenzoic acid dodecyl ester.

As to particular embodiments including a thermochromic compound and a color developer, the solvent of the color-changing system can variably interact with the thermochromic compound and the color developer according to a temperature of the color-changing system, whereby the solvent can function to control, at least in part, the thermochromic compound color change by influencing the reaction between the thermochromic compound and the color developer.

As to particular embodiments, the solvent can comprise a hydrophilic phase change material, whereby the stable nitroxide free radical can be soluble in the hydrophilic phase change material.

As to other particular embodiments, the solvent can comprise a hydrophobic phase change material, whereby the stable nitroxide free radical can be soluble in the hydrophobic phase change material.

Regarding hydrophobic phase change materials, as to particular embodiments, the solvent can have a relatively large molecular weight, for example a molecular weight not less than about 100 g/mol.

As to particular embodiments, the solvent of the color-changing system can consist of only one solvent.

As to other particular embodiments, the solvent of the color-changing system can comprise at least two solvents, which may at times be termed co-solvents.

As to particular embodiments, solvents which may be useful for the instant color-changing system can include the following, which are meant to be non-limiting examples: aldehydes; thiols; sulfides; ethers, such as aliphatic ethers having 10 or more carbon atoms and aromatic ethers; ketones, such as aliphatic ketones having 10 or more carbon atoms and alicyclic ketones; esters, such as esters of a saturated fatty acid with a branched aliphatic alcohol and esters of an unsaturated fatty acid or a saturated fatty acid having one or more branches or substituents with an aliphatic alcohol having one or more branches or 16 or more carbon atoms; alcohols, such as monohydric aliphatic saturated alcohols, alicyclic alcohols, and aromatic alcohols; acid amides; or the like; or combinations thereof.

As to particular embodiments, a solvent combination can be formulated to reduce a hysteresis window, for example to reduce thermal separation across the hysteresis window to a level demonstrating 80%, 70%, 50%, 40%, 30% or less of the thermal separation that would exist if the solvents were not present.

As to particular embodiments, at least one of the solvent combination can be selected from the group including or consisting of: derivatives of mysristic acid, derivatives of behenyl acid, derivatives of palmytic acid, and combinations thereof. Generally, these compounds can include myristates, palmitates, behenates, together with myristyl, stearyl, and behenyl compounds and certain hydrophobic alcohols.

As to particular embodiments, the light-stable and/or heat-stable composition can further include one or more additional color-changing compounds, whether a photochromic compound, a thermochromic compound, a colorant which does not change color, or the like.

Additional Protectants

As to particular embodiments, the light-stable and/or heat-stable composition can further include one or more additional protectants which may, but need not necessarily, act synergistically with the stable nitroxide free radical to enhance the light-stability and/or heat-stability of the light-degradable and/or heat-degradable compound.

As to particular embodiments, the light-stable and/or heat-stable composition can further include an ultraviolet light absorber.

As to particular embodiments, ultraviolet light absorbers which may be useful for the light-stable and/or heat-stable composition can include the following, which are meant to be non-limiting examples: benzophenone-based ultraviolet light absorbers, salicyclic acid-based ultraviolet light absorbers, cyano acrylate-based ultraviolet light absorbers, benzotriazole-based ultraviolet light absorbers, triazine-based ultraviolet light absorbers, and oxalic acid anilide-based ultraviolet light absorbers.

As to particular embodiments, benzophenone-based ultraviolet light absorbers which may be useful for the light-stable and/or heat-stable composition can include the following, which are meant to be non-limiting examples: 2,4-dihydroxybenzophenone; 2-hydroxy-4-methoxybenzophenone; 2,2'-dihydroxy-4,4'-dimethoxybenzophenone; 2,2',4,4'-tetrahydroxybenzophenone; 2-hydroxy-4-methoxybenzophenone-5-sulfonic acid; 2-hydroxy-4-n-octyloxybenzophenone; bis-(2-methoxy-4-hydroxy-5-benzoylphenyl)-methane; 2-(2'-hydroxy-3'-5'-di-t-amylphenyl)-benzophenone; 2-hydroxy-4-octadecyloxybenzophenone; 2-hydroxy-4-n-dodecyloxybenzophenone; 2,2'-dihydroxy-4-methoxybenzophenone; and 2-hydroxy-4-benzyloxybenzophenone.

As to particular embodiments, salicyclic acid-based ultraviolet light absorbers which may be useful for the light-stable and/or heat-stable composition can include the following, which are meant to be non-limiting examples: 2-4-di-t-butylphenyl-3,5-di-t-butyl-4-hydroxybenzoate; phenyl salicylate; 4-t-butylphenyl salicylate; and 4-t-octylphenyl salicylate.

As to particular embodiments, cyano acrylate-based ultraviolet light absorbers which may be useful for the light-stable and/or heat-stable composition can include the following, which are meant to be non-limiting examples: ethyl-2-cyano-3,3-diphenyl acrylate; 2-ethylhexyl-2-cyano-3,3-diphenyl acrylate; and 2-ethylhexyl-2-cyano-3-phenyl-cinnate.

As to particular embodiments, benzotriazole-based ultraviolet light absorbers which may be useful for the light-stable and/or heat-stable composition can include the following, which are meant to be non-limiting examples: 2-(5-t-butyl-2-hydroxyphenyl)-benzotriazole; 2-(5-methyl-2-hydroxyphenyl)-benzotriazole; 2-(2-hydroxy-3,5-bis(a,a-dimethylbenzyl)phenyl)-2H-benzotriazole; 2-(3,5-di-t-butyl-2-hydroxyphenyl)-benzotriazole; 2-(3-t-butyl-5-methyl-2-hydroxyphenyl)-5-chlorobenzotriazole; 2-(3-t-di-t-butyl-2-hydroxyphenyl)-5-chlorobenzotriazole; 2-(3,5-di-t-amyl-2-hydroxyphenyl)-benzotriazole; condensate of methyl-3-(3-t-butyl-5-(2H-benzotriazole-2-yl)-4-hydroxyphenyl) propionate with polyethylene glycol having a molecular weight of 300 g/mol; 2-(3-dodecyl-5-methyl-2-hydroxyphenyl)-benzotriazole; condensate of methyl-3-(3-(2H-benzotriazole-2-yl)-5-t-butyl-4-hydroxyphenyl)propionate with polyethylene glycol having a molecular weight of 300 g/mol; 2-(3-t-butyl-5-propyloxycarbonylethyl-2-hydroxyphenyl)-5-chlorobenzotriazole; 2-(2-hydroxyphenyl-3,5-di-(1,1'-dimethylbenzyl)phenyl)-2H-benzotriazole; 2-(2-hydroxy-5-t-octylphenyl)-2H-benzotriazole; 2-(3-t-butyl-5-octyloxycarbonylethyl)-2-hydroxyphenyl)-benzotriazole; and 2-(2-hydroxy-4-octyloxy-phenyl)-2H-benzotriazole.

As to particular embodiments, triazine-based ultraviolet light absorbers which may be useful for the light-stable and/or heat-stable composition can include the following, which are meant to be non-limiting examples: 2-(4-(2-hydroxy-3-tridecyloxypropyl)oxy-2-hydroxyphenyl)-4,6-bis(2,4-dimethylphenhyl)-1,3,5-triazine; 2-(4-(2-hydroxy-3-dodecyloxypropyl)oxy-2-hydroxyphenyl)-4,6-bis(2,4-dimethylphenhyl)-1,3,5-triazin; and 2-(4,4-bis(2,4-dimethylphenyl)-1,3,5-triazin-2-yl)-5-(octyloxy)phenol.

As to particular embodiments, oxalic acid anilide-based ultraviolet light absorbers which may be useful for the light-stable and/or heat-stable composition can include the following, which are meant to be non-limiting examples: ethanediamide-N-(2-ethoxyphenyl)-N'-(4-isododecylphenyl); and 2,2,4,4-tetramethyl-20-(β-lauryloxycarbonyl)-ethyl-7-oxa-3,20-diazadispiro(5,1,11,2)-heneicosan-21-one.

As to particular embodiments, the light-stable and/or heat-stable composition can further include an oxidative inhibitor.

As to particular embodiments, oxidative inhibitors which may be useful for the light-stable and/or heat-stable composition can include the following, which are meant to be non-limiting examples: hindered amine-based oxidative inhibitors, phenol-based oxidative inhibitors, sulfur-based oxidative inhibitors, and phosphoric acid-based oxidative inhibitors.

As to particular embodiments, hindered amine-based oxidative inhibitors which may be useful for the light-stable and/or heat-stable composition can include the following, which are meant to be non-limiting examples: dimethyl(1-(2-hydroxyethyl)-4-hydroxy-2,2,6,6-tetramethylpiperidine) succinate polycondensate; poly((6-(1,1,3,3-tetramethylbutyl) imino-1,3,5-triazine-2,4-diyl)((2,2,6,6-tetramethyl-4-piperidyl)imino)hexamethylene; ((2,2,6,6-tetramethyl-4-piperidyl)imino)) 2-(3,5-Di-t-butyl-4-hydroxybenzyl)-2-n-butylmalonic acid; bis(1,2,2,6,6-pentamethyl-4-piperidyl) N,N'-bis(3-aminopropyl)ethylenediamine-2,4-bis)-N-butyl-N-(1,2,2,6,6-pentamethyl-4-piperidyl)amino)-6-chloro-1,3,5-triazine condensate; bis(1,2,2,6,6-pentamethyl-4-piperidyl) sebacate; 4-benzoyloxy-2,2,6,6-tetramethylpiperidine; bis(2,2,6,6-tetramethyl-4-piperidyl) sebacate; and 1-(2-(3-(3,5-di-t-butyl-4-hydroxyphenyl)propionyloxy) ethyl)-4-3-(3,5-di-t-butyl-4-hydroxyphenyl)(propionyloxy)-2,2,6,8-tetramethylpiperidine.

As to particular embodiments, phenol-based oxidative inhibitors which may be useful for the light-stable and/or heat-stable composition can include the following, which are meant to be non-limiting examples: 2,6-di-t-butyl-4-methylphenol; mixture of 2-t-butyl-4-methoxyphenol and 3-t-butyl-4-methoxyphenol; 2,6-di-t-butyl-4-ethylphenol; octadecyl-3-(3,5-di-t-butyl-4-hydroxyphenyl)propionate; 2,2-methylenebis(4-methyl-6-t-butylphenol); 4,4-thiobis(3-methyl-6-t-butylphenol); 2,2-thiobis(4-methyl-6-t-butylphenol); 4,4-butylidenebis(3-methyl-6-t-butylphenol); 3,9-bis(1,1-dimethyl-2-(β-(3-t-butyl-4-hydroxy-5-mettiylphenyl) propionyloxy)ethyl-4,4,8,10-tetraoxaspiro(5,5)undecane; 1,1,3-tris(2-methyl-4-hydroxy-5-t-butylphenyl)butane; 1,3,5-trimethyl-2,4,6-tris(3,5-di-t-butyl-4-hydroxybenzyl)benzene; tetrakis(methylene-3-(3',5'-di-t-hydroxyphenyl)propionate)-methane; 2,2-ethylenebis(4,6-di-t-butylphenol); bis (3,3'-bis-(4'-hydroxy-3'-t-butylphenyl)butyric acid)glycol ester; tocophenol; 1,3,5-tris(4-t-butyl-3-hydroxy-2,6-dimethylbenzyl)isocyanurate; pentaerythritoltetrakis(3-laurylthiopropionate); triethylene glycol-bis(3-(3-t-butyl-5-methyl-4-hydroxyphenyl)propionate; 1,6-hexanediol-bis(3-(3,5-di-t-butyl-4-hydroxyphenyl)propionate; N,N'-hexamethylenebis(3,5-di-t-butyl-4-hydroxy-hydroxycinnamide); tris-(3,5-di-t-butyl-4-hydroxybenzyl) isocyanurate; polymerized 2,2,4-trimethyl-1,2-hydroquinone; styrenated phenol; 2,5-di-t-butyl hydroquinone; 2,4-bis-(n-octylthio)-6-(4-hydroxy-3,5-di-t-butylanilino)-1,3,5-triazine; and 2,5-di(tert-amol)hydroquinone.

As to particular embodiments, sulfur-based oxidative inhibitors which may be useful for the light-stable and/or heat-stable composition can include the following, which are meant to be non-limiting examples: dilauryl 3,3'-thiodipropionate; dimyristyl 3,3'-thiodipropionate; distearyl 3,3'-thiodipropionate; and stearyl thiopropylamide.

As to particular embodiments, phosphoric acid-based oxidative inhibitors which may be useful for the light-stable and/or heat-stable composition can include the following, which are meant to be non-limiting examples: tris(2,4-di-t-butylphenyl)phosphite; bis(2,4-di-t-butylphenyl)pentaerythritol diphosphate; 3,5-di-t-butyl-4-hydroxy-benryl phosphonate-diethylester; triphenyl phosphite; diphenyl isodecyl phosphite; phenyl diisodecyl phosphite; 4,4'-butylidene-bis (3-methyl-6-t-butylphenylditridecyl)phosphite; octadecyl phosphite; tris(nonylphenyl)phosphite; 9,10-dihydro-9-oxa-10-phosphenanethrene-10-oxide; 10-(3,5-di-t-butyl-4-hydroxybenzyl)-9,10-dihydro-9-oxa-10-phosphophenanethrene-10-oxide; 10-decyloxy-9,10-dihydro-9-oxa-10-phosphaphenanethrene; cyclic neopentatetraylbis(2,4-di-t-butylphenyl)phosphite; cyclic neopentatetraylbis(2,6'-di-t-butyl-4-methylphenyl)phosphite; and 2,2-methylenebis(4,6-di-t-butylphenyl)octyl phosphite.

As to particular embodiments, the light-stable and/or heat-stable composition can further include a quenching agent.

As to particular embodiments, quenching agents which may be useful for the light-stable and/or heat-stable composition can include the following, which are meant to be non-limiting examples: singlet oxidative quenching agents, superoxide anion quenching agents, and ozone quenching agents.

As to particular embodiments, singlet oxidative quenching agents which may be useful for the light-stable and/or heat-stable composition can include the following, which are meant to be non-limiting examples: 1,4-diazacyclo(2,2,2)octane; β-carotene; 1,3-cyclohexadiene; 2-diethylaminomethylfuran; 2-phenylaminometylfuran; and 9-diethylaminomethylanthracene.

As to particular embodiments, a superoxide anion quenching agent which may be useful for the light-stable and/or heat-stable composition can include the following non-limiting example: complex of super oxide dismutase with cobalt and nickel.

As to particular embodiments, ozone quenching agents which may be useful for the light-stable and/or heat-stable composition can include the following, which are meant to be non-limiting examples: 4,4'-thiobis(6-t-butyl(6-t-butyl-m-cresol); 2,4,6-tri-t-butylphenol; 1,4-diazadicyclo(2,2,2) octane; N-phenyl-β-naphthylamine; α-tocophenol; 4,4'-methylene-bis(2,6-di-t-butylphenol); p,p'-diaminodiphenylmethane; 2,2'-methylene-bis(6-t-butyl-P-cresol); N,N'-diphenyl-p-phenylenediamine; N,N'-diphenylethylenediamine; and N-isopropyl-N'-phenyl-p-phenylenediamine.

Matrices

As to particular embodiments, the instant light-stable and/or heat-stable composition can be incorporated into any of a numerous and wide variety of matrices such as coatings, polymers, and the like. As non-limiting examples, the instant light-stable and/or heat-stable composition can be incorporated into an ink, paint, a stain, rubber, plastic, or the like.

As but one illustrative example, the instant light-stable and/or heat-stable composition including a microencapsulated color-changing system can be incorporated into a coating. As to particular embodiments, the microencapsulated color-changing system can be incorporated into a metal coating.

As to particular embodiments, upon application to a substrate, the coating can form a cured film which has a thickness in a range of between about 3 microns to about 10 microns.

As to particular embodiments, upon application to a substrate, the coating can form a cured film which has a thickness in a range of between about 3 microns to about 5 microns.

As to particular embodiments, the coating can comprise an ink.

As to particular embodiments, the ink can be selected from the group including or consisting of: metal decoration inks, offset inks, lithographic inks, flexographic inks, gravure inks, and screen inks.

As to particular embodiments, upon application to a substrate, the ink can form a cured film which has a thickness in a range of between about 1 micron to about 10 microns.

As to particular embodiments, upon application to a substrate, the ink can form a cured film which has a thickness in a range of between about 1 micron to about 5 microns.

Chemical Structure

As described above, the stable nitroxide free radical of the instant invention can be represented by Formula I:

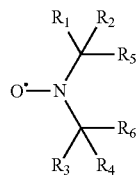

I wherein:

$R_1$ is independently alkyl, or forms a ring together with $R_2$ or $R_3$;

$R_2$ is independently alkyl, or forms a ring together with $R_1$ or $R_4$;

$R_3$ is independently alkyl, or forms a ring together with $R_1$ or $R_4$;

$R_4$ is independently alkyl, or forms a ring together with $R_2$ or $R_3$; and $R_5$ and $R_6$ are each independently alkyl, or together form a ring.

As to particular embodiments wherein at least one of $R_1$, $R_2$, $R_3$, or $R_4$ are independently alkyl, the alkyl moiety can comprise one to four carbons, depending upon the embodiment.

As to particular embodiments wherein at least one of $R_1$ and $R_2$ together form a ring or $R_3$ and $R_4$ together form a ring, the ring can be pentamethylene.

As to particular embodiments, at least one of: $R_1$ and $R_2$ together form a ring; $R_3$ and $R_4$ together form a ring; $R_1$ and $R_3$ together form a ring; $R_2$ and $R_4$ together form a ring; or $R_5$ and $R_6$ together form a ring.

As to particular embodiments, the stable nitroxide free radical of the instant invention has the following Formula IX:

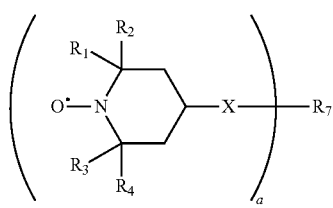

IX wherein:

$R_1$ and $R_3$ are each independently alkyl, or together form a ring;

$R_2$ and $R_4$ are each independently alkyl, or together form a ring;

X is independently selected from alkyl, ester, ether, amine, carbamate, amide, urea, sulfate, or thioether;

$R_7$ is selected from aliphatic, aromatic, or star-shaped amino; and a is between 1 and 4.

As to particular embodiments, the stable nitroxide free radical of the instant invention has the following Formula X:

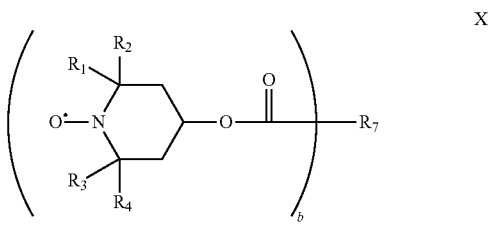

X wherein:

$R_1$ and $R_3$ are each independently alkyl, or together form a ring;

$R_2$ and $R_4$ are each independently alkyl, or together form a ring;

$R_7$ is selected from aliphatic, aromatic, or star-shaped amino; and b is between 1 and 4.

As but one example, the stable nitroxide free radical of the instant invention has the following Formula XI:

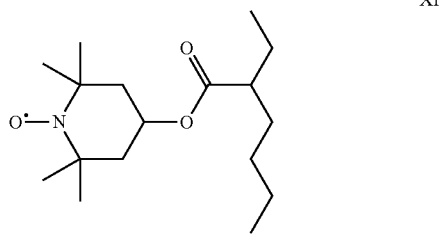

XI

As to particular embodiments, the stable nitroxide free radical of the instant invention has the following Formula XII:

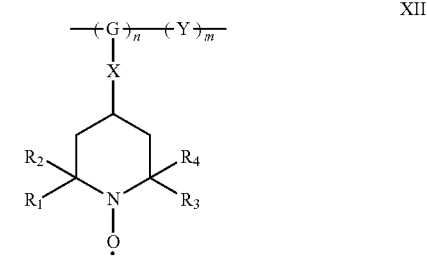

XII wherein:

$R_1$ is independently alkyl, or forms a ring together with $R_2$ or $R_3$;

$R_2$ is independently alkyl, or forms a ring together with $R_1$ or $R_4$;

$R_3$ is independently alkyl, or forms a ring together with $R_1$ or $R_4$;

$R_4$ is independently alkyl, or forms a ring together with $R_2$ or $R_3$;

X is independently selected from alkyl, ester, ether, amine, carbamate, amide, urea, sulfate, or thioether;

G and Y are each independently a repeating unit of a polymer backbone; and n and m are each independently between 1 and 500.

Example 1

As but one illustrative example shown in Table 1, in a particular embodiment of the inventive light-stable and/or heat-stable composition formulated as a thermochromic ink, incorporation of the stable nitroxide free radical (SNFR) represented by Formula XI at about 0.1% to about 5% by weight of the color-changing system resulted in a blue color-changing compound, 3,3-bis(p-dimethyl-aminophenyl)-6-dimethylaminophthalide (CAS No: 1552-42-7), exhibiting about 5 hours of lightfastness, as measured in a Q-SUN Xe-1 xenon test chamber (model Q-SUN Xe-1-B/S) using an irradiance level of 0.84 W/m² at 420 nm with the chamber temperature at 600 Celsius. In contrast, under equivalent testing conditions, an ink including 10% TINUVIN® 400 (CAS No: 153519-44-9), which is a mixture of 2-[4-[2-Hydroxy-3-tridecyloxypropyl]oxy]-2-hydroxyphenyl]-4,6-bis(2,4-dimethylphenyl)-1,3,5-triazine and 2-[4-[2-hydroxy-3-didecyloxypropyl]oxy]-2-hydroxyphenyl]-4,6-bis(2,4-dimethylphenyl)-1,3,5-triazine, resulted in the blue color-changing compound exhibiting only about 2 hours of lightfastness. Correspondingly, at only a fraction of the amount, the instant stable nitroxide free radical (SNFR) provided a significant enhancement in lightfastness of the blue color-changing compound relative to TINUVIN® 400, which should be classified as a difference in kind, rather than one of degree. Of note, without either the instant stable nitroxide free radical (SNFR) or TINUVIN® 400, the blue color-changing compound exhibited only about 1 hour of lightfastness under equivalent testing conditions.

TABLE 1

| Color-changing Compound CAS | Stabilizer | % Stabilizer in Color-changing System | Light-fastness | % Lightfastness Enhancement by SNFR |
|---|---|---|---|---|
| 1552-42-7 | SNFR | 0.1%-5% | 5 hours | — |
| 1552-42-7 | TINUVIN ® 400 | 10% | 2 hours | 150% |
| 1552-42-7 | — | — | 1 hour | 400% |

Example 2

As but a second illustrative example shown in Table 2, in a particular embodiment of the inventive light-stable and/or heat-stable composition formulated as a thermochromic ink, incorporation of the stable nitroxide free radical (SNFR) represented by Formula XI at about 0.1% to about 5% by weight of the color-changing system resulted in a blue color-changing compound, 3,3-bis(p-dimethyl-aminophenyl)-6-dimethylaminophthalide (CAS No: 1552-42-7), exhibiting about 5 hours of lightfastness, as measured in a Q-SUN Xe-1 xenon test chamber (model Q-SUN Xe-1-B/S) using an irradiance level of 0.84 W/m² at 420 nm with the chamber temperature at 600 Celsius. In contrast, under equivalent testing conditions, an ink including 1.24% TINUVIN® 123 (CAS No: 129757-67-1), which is bis(1-octyloxy-2,2,6,6-tetramethyl-4-piperidyl) sebacate, resulted in the blue color-changing compound exhibiting only about 2 hours of lightfastness. Correspondingly, at only a fraction of the amount, the instant stable nitroxide free radical provided a significant enhancement in lightfastness of the blue color-changing compound relative to TINUVIN® 123, which should be classified as a difference in kind, rather than one of degree. Of note, without either the instant stable nitroxide free radical or TINUVIN® 123, the blue color-changing compound exhibited only about 1 hour of lightfastness under equivalent testing conditions.

TABLE 2

| Color-changing Compound CAS | Stabilizer | % Stabilizer in Color-changing System | Light-fastness | % Lightfastness Enhancement by SNFR |
|---|---|---|---|---|
| 1552-42-7 | SNFR | 0.1%-5% | 5 hours | — |
| 1552-42-7 | TINUVIN ® 123 | 1.24% | 2 hours | 150% |
| 1552-42-7 | — | — | 1 hour | 400% |

Example 3

As but a third illustrative example shown in Table 3, in a particular embodiment of the inventive light-stable and/or heat-stable composition formulated as a thermochromic ink, incorporation of the stable nitroxide free radical (SNFR) represented by Formula XI at about 0.1% to about 5% by weight of the color-changing system resulted in a blue color-changing compound, 7-[4-(diethylamino)-2-ethoxyphenyl]-7-(1-ethyl-2-methyl-1H-indol-3-yl)furo[3,4-b]pyridine-5(7H)-one (CAS No: 69898-40-4), exhibiting about 9 hours of lightfastness, as measured in a Q-SUN Xe-1 xenon test chamber (model Q-SUN Xe-1-B/S) using an irradiance level of 0.84 W/m² at 420 nm with the chamber temperature at 600 Celsius. In contrast, under equivalent testing conditions, an ink including 1.24% TINUVIN® 123 resulted in the blue color-changing compound exhibiting only about 6 hours of lightfastness. Correspondingly, at only a fraction of the amount, the instant stable nitroxide free radical provided a significant enhancement in lightfastness of the blue color-changing compound relative to TINUVIN® 123, which should be classified as a difference in kind, rather than one of degree. Of note, without either the instant stable nitroxide free radical or TINUVIN® 123, the blue color-changing compound exhibited only about 3 hours of lightfastness under equivalent testing conditions.

TABLE 3

| Color-changing Compound CAS | Stabilizer | % Stabilizer in Color-changing System | Light-fastness | % Lightfastness Enhancement by SNFR |
|---|---|---|---|---|
| 69898-40-4 | SNFR | 0.1%-5% | 9 hours | — |
| 69898-40-4 | TINUVIN ® 123 | 1.24% | 6 hours | 50% |
| 69898-40-4 | — | — | 3 hours | 200% |

Example 4

As but a fourth illustrative example shown in Table 4, in a particular embodiment of the inventive light-stable and/or heat-stable composition formulated as a thermochromic ink, incorporation of the stable nitroxide free radical (SNFR) represented by Formula XI at about 0.1% to about 5% by weight of the color-changing system resulted in an aqua color-changing compound, 3,3-bis(2-ethoxy-4-diethylaminophenyl)-4-azaphthalide (CAS No: 132467-74-4), exhibiting about 11 hours of lightfastness, as measured in a Q-SUN Xe-1 xenon test chamber (model Q-SUN Xe-1-B/S) using an irradiance level of 0.84 W/m$^2$ at 420 nm with the chamber temperature at 600 Celsius. In contrast, under equivalent testing conditions, an ink including 1.24% TINUVIN® 123 resulted in the aqua color-changing compound exhibiting only about 8 hours of lightfastness. Correspondingly, at only a fraction of the amount, the instant stable nitroxide free radical provided a significant enhancement in lightfastness of the aqua color-changing compound relative to TINUVIN® 123, which should be classified as a difference in kind, rather than one of degree. Of note, without either the instant stable nitroxide free radical or TINUVIN® 123, the aqua color-changing compound exhibited only about 4 hours of lightfastness under equivalent testing conditions.

TABLE 4

| Color-changing Compound CAS | Stabilizer | % Stabilizer in Color-changing System | Light-fastness | % Lightfastness Enhancement by SNFR |
|---|---|---|---|---|
| 132467-74-4 | SNFR | 0.1%-5% | 11 hours | — |
| 132467-74-4 | TINUVIN ® 123 | 1.24% | 8 hours | 37.5% |
| 132467-74-4 | — | — | 4 hours | 175% |

Example 5

As but a fifth illustrative example shown in Table 5, in another particular embodiment of the inventive light-stable and/or heat-stable composition formulated as a thermochromic ink, incorporation of the stable nitroxide free radical (SNFR) represented by Formula XI at about 0.1% to about 5% by weight of the color-changing system resulted in a red color-changing compound, 3,3-bis(1-n-butyl-2-methylindole-3-yl)phthalide (CAS No: 50292-91-6), exhibiting about 5 hours of lightfastness, as measured in a Q-SUN Xe-1 xenon test chamber (model Q-SUN Xe-1-B/S) using an irradiance level of 0.84 W/m$^2$ at 420 nm with the chamber temperature at 60° Celsius. In contrast, under equivalent testing conditions, an ink including 10% TINUVIN® 400 resulted in the red color-changing compound exhibiting only about 4 hours of lightfastness. Correspondingly, at only a fraction of the amount, the instant stable nitroxide free radical provided a significant enhancement in lightfastness of the red color-changing compound relative to TINUVIN® 400, which should be classified as a difference in kind, rather than one of degree. Of note, without either the instant stable nitroxide free radical or TINUVIN® 400, the red color-changing compound exhibited only about 3 hours of lightfastness under equivalent testing conditions.

TABLE 5

| Color-changing Compound CAS | Stabilizer | % Stabilizer in Color-changing System | Light-fastness | % Lightfastness Enhancement by SNFR |
|---|---|---|---|---|
| 50292-91-6 | SNFR | 0.1%-5% | 5 hours | — |
| 50292-91-6 | TINUVIN ® 400 | 10% | 4 hours | 25% |
| 50292-91-6 | — | — | 3 hours | 67% |

Example 6

As but a sixth illustrative example shown in Table 6, in a particular embodiment of the inventive light-stable and/or heat-stable composition formulated as a thermochromic ink, incorporation of the stable nitroxide free radical (SNFR) represented by Formula XI at about 0.1% to about 5% by weight of the color-changing system resulted in a red color-changing compound, 3,3-bis(1-n-butyl-2-methylindole-3-yl)phthalide (CAS No: 50292-91-6), exhibiting about 5 hours of lightfastness, as measured in a Q-SUN Xe-1 xenon test chamber (model Q-SUN Xe-1-B/S) using an irradiance level of 0.84 W/m$^2$ at 420 nm with the chamber temperature at 60° Celsius. In contrast, under equivalent testing conditions, an ink including 1.24% TINUVIN® 123 resulted in the red color-changing compound exhibiting only about 4 hours of lightfastness. Correspondingly, at only a fraction of the amount, the instant stable nitroxide free radical provided a significant enhancement in lightfastness of the red color-changing compound relative to TINUVIN® 123, which should be classified as a difference in kind, rather than one of degree. Of note, without either the instant stable nitroxide free radical or TINUVIN® 123, the red color-changing compound exhibited only about 3 hours of lightfastness under equivalent testing conditions.

TABLE 6

| Color-changing Compound CAS | Stabilizer | % Stabilizer in Color-changing System | Light-fastness | % Lightfastness Enhancement by SNFR |
|---|---|---|---|---|
| 50292-91-6 | SNFR | 0.1%-5% | 5 hours | — |
| 50292-91-6 | TINUVIN ® 123 | 1.24% | 4 hours | 25% |
| 50292-91-6 | — | — | 3 hours | 67% |

A method of making the instant light-stable and/or heat-stable composition includes combining a light-degradable and/or heat-degradable compound with a stabilizer which enhances the light-stability and/or heat-stability of the light-degradable and/or heat-degradable compound, whereby the stabilizer is incorporated into the composition as a stable nitroxide free radical.

As to particular embodiments, a method of making the instant light-stable and/or heat-stable composition includes making a color-changing system by combining a color-changing compound, a solvent, and a stabilizer which enhances the light-stability and/or heat-stability of the color-changing compound, whereby the stabilizer is incorporated into the color-changing system as a stable nitroxide free radical.

Said another way, the stable nitroxide free radical is combined with the color-changing compound and the solvent to provide the color-changing system.

As used herein, the term "combination or combining" refers to any method of putting two or more materials together. Such methods include, but are not limited to, mixing, blending, commingling, concocting, homogenizing, ultrasonic homogenizing, incorporating, intermingling, fusing, joining, shuffling, stirring, coalescing, integrating, confounding, uniting, creating a solution of two or more materials, creating a suspension of two immiscible materials, such as an emulsion, via any number of means, or the like, or combinations thereof.

The method can further include combining additional components with the instant light-stable and/or heat-stable composition as described above.

As can be easily understood from the foregoing, the basic concepts of the present invention may be embodied in a variety of ways. The invention involves numerous and varied embodiments of light-stable and/or heat-stable compositions and methods for making and using such light-stable and/or heat-stable compositions.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "combination" should be understood to encompass disclosure of the act of "combining"—whether explicitly discussed or not—and, conversely, were there effectively disclosure of the act of "combining", such a disclosure should be understood to encompass disclosure of a "combination" and even a "means for combining". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the light-stable and/or heat-stable compositions herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A light-stable composition comprising:
a color-changing system comprising:
a color-changing compound;
a solvent; and
a stabilizer which enhances light-stability of said color-changing compound;
wherein said stabilizer is incorporated into said composition as a stable nitroxide free radical; and
wherein an amount of said stable nitroxide free radical is not greater than 1 percent by weight of said composition.

2. The composition of claim 1, wherein said stable nitroxide free radical is a cyclic stable nitroxide free radical which includes a ring.

3. The composition of claim 2, wherein said cyclic stable nitroxide free radical includes at least one hindering group at an alpha position relative to a nitrogen in said ring.

4. The composition of claim 2, wherein said cyclic stable nitroxide free radical is selected from compounds of Formulas II through VIII.

5. A light-stable composition comprising:
a color-changing system comprising:
a color-changing compound;
a solvent; and
a stabilizer which enhances light-stability of said color-changing compound;
wherein said stabilizer is incorporated into said composition as a stable nitroxide free radical; and
wherein said color-changing system is encapsulated within a microcapsule to provide a microencapsulated color-changing system.

6. A light-stable composition comprising:
a color-changing system comprising:
a color-changing compound;
a solvent; and
a stabilizer which enhances light-stability of said color-changing compound;
wherein said stabilizer is incorporated into said composition as a stable nitroxide free radical; and
wherein said color-changing compound irreversibly changes color.

7. A light-stable composition comprising:
a color-changing system comprising:
a color-changing compound;
a solvent; and
a stabilizer which enhances light-stability of said color-changing compound;
wherein said stabilizer is incorporated into said composition as a stable nitroxide free radical; and
wherein said color-changing compound reversibly changes color.

8. A light-stable composition comprising:
a color-changing system comprising:
a color-changing compound;
a solvent; and
a stabilizer which enhances light-stability of said color-changing compound;
wherein said stabilizer is incorporated into said composition as a stable nitroxide free radical; and
wherein said color-changing compound comprises a photochromic compound.

9. A light-stable composition comprising:
a color-changing system comprising:
a color-changing compound;
a solvent; and
a stabilizer which enhances light-stability of said color-changing compound;
wherein said stabilizer is incorporated into said composition as a stable nitroxide free radical; and
wherein said color-changing compound comprises a thermochromic compound.

10. A light-stable composition comprising:
a color-changing system comprising:
a color-changing compound;
a solvent; and
a stabilizer which enhances light-stability of said color-changing compound;
wherein said stabilizer is incorporated into said composition as a stable nitroxide free radical; and
wherein said color-changing system is incorporated into a coating comprising an ink.

11. A light-stable composition comprising:
a color-changing system comprising:
a color-changing compound;
a solvent; and
a stabilizer which enhances light-stability of said color-changing compound;
wherein said stabilizer is incorporated into said composition as a stable nitroxide free radical; and
wherein said stable nitroxide free radical comprises a cyclic stable nitroxide free radical which includes a ring.

12. A light-stable composition comprising:
a color-changing system comprising:
a color-changing compound;
a solvent; and
a stabilizer which enhances light-stability of said color-changing compound;
wherein said stabilizer is incorporated into said composition as a stable nitroxide free radical; and
wherein said stable nitroxide free radical comprises the following formula:

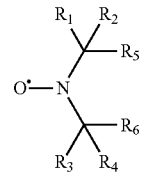

wherein:
$R_1$ is independently alkyl, or forms a ring together with $R_2$ or $R_3$;
$R_2$ is independently alkyl, or forms a ring together with $R_1$ or $R_4$;
$R_3$ is independently alkyl, or forms a ring together with $R_1$ or $R_4$;

$R_4$ is independently alkyl, or forms a ring together with $R_2$ or $R_3$; and $R_5$ and $R_6$ are each independently alkyl, or together form a ring.

13. The composition of claim 12, wherein at least one of:
$R_1$ and $R_2$ together form a ring;
$R_3$ and $R_4$ together form a ring;
$R_1$ and $R_3$ together faun a ring;
$R_2$ and $R_4$ together form a ring; or
$R_5$ and $R_6$ together form a ring.

14. The composition of claim 13, wherein:
$R_5$ and $R_6$ together form a ring; and
said ring formed from $R_5$ and $R_6$ is a heterocyclic ring.

15. The composition of claim 14, wherein a nitrogen of said stable nitroxide free radical is included in said heterocyclic ring formed from $R_5$ and $R_6$.

* * * * *